United States Patent [19]

Jackson, Jr. et al.

[11] 4,327,206

[45] Apr. 27, 1982

[54] PROCESS FOR PREPARING POLY-1,4-CYCLOHEXANEDICARBOXYLATE POLYESTERS HAVING HIGH TRANS ISOMER CONTENT

[75] Inventors: Winston J. Jackson, Jr., Kingsport, Tenn.; William R. Darnell, Weber City, Va.

[73] Assignee: Eastman Kodak Co., Rochester, N.Y.

[21] Appl. No.: 248,586

[22] Filed: Mar. 27, 1981

[51] Int. Cl.$^3$ .................. C08G 63/04; C08G 63/22
[52] U.S. Cl. .................................. 528/179; 528/180; 528/274; 528/279; 528/302
[58] Field of Search ............... 528/179, 180, 274, 279, 528/302

[56] References Cited

U.S. PATENT DOCUMENTS

| | | | |
|---|---|---|---|
| 4,075,173 | 2/1978 | Maruyama et al. | 528/179 X |
| 4,131,601 | 12/1978 | Hashimoto et al. | 528/279 |
| 4,153,781 | 5/1979 | Thillier et al. | 528/274 |

*Primary Examiner*—Lucille M. Phynes
*Attorney, Agent, or Firm*—William P. Heath, Jr.; D. B. Reece, III

[57] ABSTRACT

A new process for the preparation of poly-1,4-cyclohexanedicarboxylate polyesters having high (>80%) trans isomer content comprises heating in the presence of a suitable catalyst an ester of trans-1,4-cyclohexanedicarboxylic acid and a diacyl derivative of an aromatic diol.

9 Claims, No Drawings

PROCESS FOR PREPARING POLY-1,4-CYCLOHEXANEDICARBOXYLATE POLYESTERS HAVING HIGH TRANS ISOMER CONTENT

TECHNICAL FIELD

This invention is a process for preparing polyesters from esters of 1,4-cyclohexanedicarboxylic acid and diacyl derivatives of aromatic diols, the polyesters having a trans isomer content of at least 80 percent. The polyesters may be prepared by heating at $\leq 320°$ C. (preferably about 300° C.) essentially equimolar amounts of a diacyl derivative of an aromatic diol(s) and a diester of trans-1,4-cyclohexanedicarboxylic acid in the presence of an appropriate catalyst. When $\sim 80\%$ of the theoretical monomeric ester byproduct has been evolved, reduced pressure is applied until a viscous melt is obtained or the reaction solidifies, depending upon the crystalline melting point of the polyester being prepared.

The polyesters of this invention have utility as molding plastics, fibers, films, adhesives, and coatings.

BACKGROUND ART

The general idea of reacting a diacyl derivative of a bisphenol or glycol with a diester of a carboxylic acid to form a polyester has been disclosed in Polymer, Vol. 15, pp. 531–532; in U.S. Pat. No. 4,075,173 (columns 2 and 3); and in U.K. Pat. No. 590,417. In the first two references only oligomeric materials were obtained when bisphenol A diacetate was reacted with dimethyl terephthalate. In the U.K. patent, high molecular weight poly(alkylene terephthalates) are disclosed with no reference to aromatic diols.

DISCLOSURE OF THE INVENTION

This invention is a process for preparing poly-1,4-cyclohexanedicarboxylate polyesters having a trans isomer content of at least 80 percent, the process comprising preparing a reaction mixture of (1) at least 50 mole percent of an alkyl or aryl diester of trans 1,4-cyclohexanedicarboxylic acid having the general formula

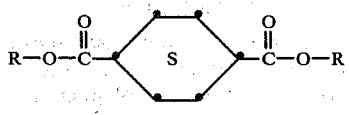

wherein the R's are the same or different and are selected from alkyl groups containing 1 to 4 carbon atoms or phenyl; (2) up to 50 mole percent of a diester of an aromatic dicarboxylic acid having the general formula

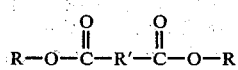

wherein the R's are the same or different and are selected from alkyl groups containing 1 to 4 carbon atoms or phenyl and R' is an aromatic ring structure containing 8 to 20 carbon atoms; (3) at least one diacyl ester of an aromatic diol having the general formula

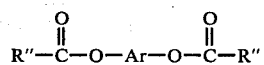

wherein the R'''s may be the same or different and are selected from alkyl groups containing 1 to 4 carbon atoms or phenyl and Ar is the aromatic residue remaining after removal of the hydroxyl groups from an aromatic diol and may be substituted with an alkyl group containing 1 to 4 carbon atoms or phenyl and may contain two or more aromatic diol residues; and (4) a catalytic amount of a suitable ester exchange and polymerization catalyst; initially heating said reaction mixture sufficient for ester exchange to occur and to eliminate ester condensation byproduct, the byproduct having the following general formula

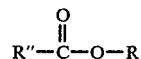

wherein R'' is an alkyl group containing 1 to 4 carbon atoms or phenyl and R is an alkyl group containing 1 to 4 carbon atoms or phenyl, and reducing pressure to further remove said ester condensation byproduct and to increase the molecular weight of the polyester product. The reaction is begun at a temperature of $\sim 260°$–$280°$ C. and is increased to a maximum of about 320° C. as the amount of monomeric ester condensation byproduct increases. The temperature of the reaction preferably does not exceed about 300° C. The catalyst may be selected from compounds of titanium or tin, for example, titanium tetraisopropoxide, titanium tetrabutoxide, acetyltriisopropyltitanate, dibutyl tin dioxide, and dibutyl tin diacetate. Preferably the catalyst is titanium tetraisopropoxide and is present in the amount of about 100 to 300 parts per million metal based on theoretical polymer yield. Also a prepolymer may be prepared, comminuted, crystallized and further polymerized in the solid state at a temperature of at least 10° C. below the melting point of the polymer but not exceeding about 300° C. Also disclosed are the products of the processes.

PREFERRED EMBODIMENTS

The preparation of polyesters of aromatic diols has long been effected by those skilled in the art by acidolysis (reaction of a dicarboxylic acid with a diacyl derivative of an aromatic diol at elevated temperature) and by solution methods involving the reaction of a dicarboxylic acid chloride with an aromatic diol in the presence of an acid acceptor. The well-known acidolysis procedure is undesirable for preparing many polyesters of trans-1,4-cyclohexanedicarboxylic acid because of the substantial isomerization of the trans-1,4-cyclohexanedicarboxylate moiety which occurs during the reaction of a diacyl derivative of an aromatic diol (such as bisphenol A) with trans-1,4-cyclohexanedicarboxylic acid. Because of the substantial isomerization which occurs, the crystalline melting point of the polyester and the amount of crystallinity are greatly reduced (perhaps to the point of the polyester becoming amorphous), and the heat resistance of the polyester is therefore reduced. The solution methods, when used for the preparation of many polyesters of trans-1,4-cyclohexanedicarboxylic acid, are undesirable because of polymer insolubility, which results in low-molecular-weight polyester, and the inherently expensive nature of solution polymerization methods in general.

This invention provides a new process for preparing polyesters of aromatic diols and 1,4-cyclohexanedicarboxylic acid containing a high level (>80%) of the trans-1,4-cyclohexanedicarboxylate moiety and is accomplished by heating at ≦320° C. (preferably about 300° C.) a diacyl derivative of an aromatic diol(s) with a diester of trans-1,4-cyclohexanedicarboxylic acid in the presence of an appropriate catalyst according to the following equation:

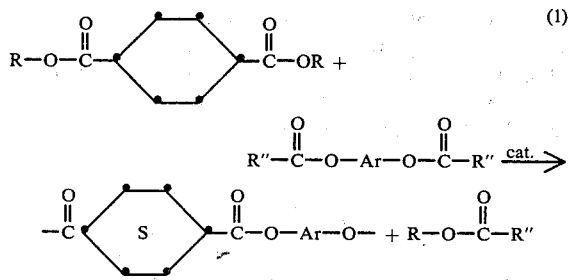

The polyesters of the invention are prepared by heating at ≦320° C. (preferably about 300° C.) essentially equimolar amounts of a diacyl derivative of an aromatic diol(s) and a diester of trans-1,4-cyclohexanedicarboxylic acid in the presence of an appropriate catalyst. The reaction is preferably begun at ~260°–280° C., and the temperature is increased as the amount of monomeric ester byproduct increases, but not above about 320° C. (preferably about 300° C.). At temperatures appreciably exceeding 300° C., isomerization of the trans-1,4-cyclohexanedicarboxylate moiety becomes appreciable. When ~80% (preferably ~90%) of the theoretical monomeric ester byproduct has been evolved, reduced pressure is applied (<10 torr and preferably <1 torr) until a viscous melt is obtained or the reaction mixture solidifies, depending upon the crystalline melting point of the polyester being prepared.

The molecular weight of those polyesters which solidify is increased as desired by solid phasing the prepolymer at about 300° C. I.V.'s of 0.6–0.8 or higher may be obtained by this procedure.

In Equation 1 supra, each R and R" may be the same or different and are selected from alkyl groups containing 1 to 4 carbon atoms and phenyl. Examples of such alkyl groups are methyl, ethyl and butyl. It is preferred that R be methyl. (Ar) is the aromatic residue remaining after removal of the hydroxyl groups from an aromatic diol. It may be substituted with alkyl groups containing 1 to 4 carbon atoms and phenyl, and may contain two or more aromatic diol residues. Because of the extremely high melting points of some of the trans-1,4-cyclohexanedicarboxylate homopolymers, such as with hydroquinone, it is advantageous to prepare lower melting copolymers containing two or more aromatic diol residues. Examples of aromatic diols (as their diacyl derivatives) which may be used in the process of the invention are 4,4'-(isopropylidene)diphenol, 4,4'-(cyclohexylidene)diphenol, 4,4'-dihydroxybiphenol, 2,6-naphthalenediol, p,p'-oxydiphenol, hydroquinone, methylhydroquinone, phenylhydroquinone, 4,4'-dihydroxydiphenylmethane, 4,4'-dihydroxydiphenol ether, and 4,4'-dihydroxydiphenyl sulfone. Other aromatic diols may be used in this invention so long as these diols and the polymers prepared therefrom have sufficient thermal stability to withstand the conditions of polymer preparation.

In the process of the invention, up to about 50 mole percent of a diester of an aromatic dicarboxylic acid(s) may be substituted for the diester of trans-1,4-cyclohexanedicarboxylic acid utilized in the process. Examples of such aromatic acids are terephthalic, isophthalic, and naphthalenedicarboxylic acids.

Catalysts which are particularly effective in the process of the invention are compounds of titanium and tin, such as titanium tetraisopropoxide, titanium tetrabutoxide, acetyltriisopropyltitanate, dibutyl tin dioxide, and dibutyl tin diacetate. The catalyst concentration utilized in the process may vary from about 25 to 1,000 ppm or more based on theoretical polymer yield, depending upon the catalyst specie and polymerization conditions used, but the preferred catalyst concentration is 100 to 300 ppm for the preferred catalyst, titanium tetraisopropoxide. It is advantageous to use a minimum amount of catalyst because of increased isomerization of the trans-1,4-cyclohexanedicarboxylate moiety at the higher catalyst concentrations.

As earlier stated, substantial isomerization of the trans-1,4-cyclohexanedicarboxylate moiety occurs during the preparation of many aromatic diol polyesters of trans-1,4-cyclohexanedicarboxylic prepared by acidolysis. The probable cause for this isomerization is the presence of the dicarboxylic acid which is used in the acidolysis process, as indicated by the data in Table 1. For the experiments described in Table 1, ≧98% trans-dimethyl 1,4-cyclohexanedicarboxylate (I) and ≧98% trans-1,4-cyclohexanedicarboxylic acid (II) were heated under nitrogen at 275° C. for one hour neat, as a mixture, and mixed with distilled benzophenone as a solvent if material did not melt.

TABLE 1

| Material Heated | Trans Content, % |
|---|---|
| (I) | 97 |
| (II) (material did not melt) | ≧98 |
| (II)/benzophenone (50 wt. %) | 64 |
| (I)/(II), (1/1 molar mixture) | 67 |

This invention will be further illustrated by the following examples although it will be understood that these examples are included merely for purposes of illustration and are not intended to limit the scope of the invention.

EXAMPLES

In the examples, the inherent viscosities of the polymers are determined at 25° C. in a 40/36/24 weight mixture of p-chlorophenol/phenol/1,1,2,2-tetrachloroethane at a concentration of 0.1 g/100 ml. The melting points are determined with a Perkin-Elmer DSC-2 differential scanning calorimeter. Films are pressed in a Hannafin press at 10°–20° C. above the melting point of the respective polymers. The $^{13}C$ NMR spectra are obtained with a Brüker HX-90E carbon-13 NMR spectrometer, using a mixture of trifluoroacetic acid/d-chloroform as a solvent.

1. This example illustrates the substantial amount of isomerization of the trans-1,4-cyclohexanedicarboxylate moiety which occurs during the preparation of the bisphenol A homopolyester prepolymer by the well-known "acidolysis" procedure of the prior art.

A mixture of 60.2 g. (0.35 mole) trans-1,4-cyclohexanedicarboxylic acid, 109.2 g. (0.35 mole) bisphenol A diacetate, and titanium tetraisopropoxide (150 ppm Ti, based on the total weight of polymer being prepared) are placed in a 500 ml. glass flask equipped with metal stirrer and provision for maintaining a nitrogen atmosphere in the flask. Provision is also made for applying vacuum to the flask. The flask is evacuated to 0.5 torr and purged with nitrogen three times. The flask is then partially immersed in a metal bath maintained at 250° C., and the metal bath temperature is increased to 260° C. after 17 minutes. After six minutes, a low-boiling distillate is evident. After the reaction mixture is heated for 90 minutes at 260° C., the metal bath temperature is increased to 280° C. for 45 minutes. Vacuum is applied to the flask and the pressure is reduced to ≦0.5 torr during 14 minutes and continued for 30 minutes. A high melt viscosity, light amber molten polymer is obtained. The I.V. of the polymer is 0.43, and the trans-1,4-cyclohexanedicarboxylate content of the polymer is determined by $^{13}C$ NMR to be 63%. This value is similar to those of the last two examples in Table 1. The polyester is noncrystalline (no melting point observed by differential scanning calorimetry).

2. This example illustrates the small amount of isomerization of the trans-1,4-cyclohexanedicarboxylate moiety which occurs during the preparation of the bisphenol A homopolyester prepolymer by the process of this invention.

A mixture of 70.0 g. (0.35 mole) trans-dimethyl 1,4-cyclohexanedicarboxylate, 109.2 g. (0.35 mole) bisphenol A diacetate, and titanium tetraisopropoxide (150 ppm Ti, based on the weight of polymer being made) are placed in a flask equipped as described in Example 1. After being purged with nitrogen three times as described in Example 1, the contents of the flask are dried at 100° C. for 30 minutes at 20 torr. After being bled to nitrogen, the flask is removed from the metal bath, and the metal bath temperature is increased to 280° C. With stirring under a nitrogen atmosphere, the flask is reimmersed in the metal bath and heated at 280° C. for 55 minutes. After 10 minutes, a distillate is evident. The metal bath temperature is then increased to 290° C. and heating is continued for an additional 55 minutes. At this time the reaction mixture has turned to an opaque semisolid, so the metal bath temperature is further increased to 320° C. After 15 minutes, vacuum is applied and the pressure is decreased to <0.5 torr during 8 minutes. At this time the reaction mixture has turned to soft solid chunks. After being stirred for an additional 5 minutes at ≦0.5 torr, the reaction mixture turns to hard solid chunks and is cooled. The I.V. of the prepolymer is 0.24, and the melting point and glass transition temperature of the prepolymer are, respectively, 348° C. and 129° C. The trans-1,4-cyclohexanedicarboxylate content of the prepolymer is 92% (see Example 3).

3. This example illustrates the further solid phase polymerization of the prepolymer obtained in Example 2 by the process of this invention.

The prepolymer from Example 2 is granulated through a ¼-inch screen, and 18.0 g. of the granulate is placed in a glass tube (1⅜-inch×9-inch) having a ground glass joint. The glass tube is connected to a vacuum line and evacuated to 0.2 torr. The evacuated tube is then placed in a heated metal block maintained at 125° C. for 50 minutes to dry the polyester prepolymer and then the tube is removed from the block. The metal block temperature is then raised to 300° C., and the tube (still at 0.2 torr) is replaced in the block for 3 hours. After being cooled under vacuum, the straw-colored polyester particles are removed from the glass tube. The polyester has an I.V. of 0.71 and contains 87% of the trans-1,4-cyclohexanedicarboxylate moiety. The melting point and glass transition temperature are, respectively, 381° C. and 173° C.

4. This example illustrates the preparation of a copolymer which contains a second acid moiety (in addition to the trans-1,4-cyclohexanedicarboxylate moiety).

A mixture of 38.0 g. (0.175 mole) trans-dimethyl 1,4-cyclohexanedicarboxylate, 33.95 g. (0.175 mole) of dimethyl terephthalate, 109.2 g. (0.35 mole) bisphenol A diacetate, and titanium tetraisopropoxide (450 ppm Ti, based on the weight of polymer) are placed in a 500 ml. glass flask equipped as described in Example 1. After being purged with nitrogen as described in Example 1, the flask is partially immersed in a metal bath maintained at 280° C. and heated with stirring under nitrogen for 60 minutes. (After 8 minutes heating, a low-boiling distillate is evident.) At this time, the weight of distillate is 49.2 g. (91% of theory). The flask is then evacuated during 11 minutes to <0.5 torr. Nine minutes after the evacuation of the flask is begun, the reaction mixture begins to turn solid. After being stirred under <0.5 torr at 280° C. for 16 minutes, the polymerization mixture has turned completely to hard solid lumps. The I.V. of this prepolymer is 0.19 and the trans-1,4-cyclohexanedicarboxylate content is 91%.

After the above prepolymer is granulated through a ¼-inch screen, 18.0 g. of the granules are built up in the solid state by the procedure described in Example 3. The straw-colored polyester has an I.V. of 0.57 and contains 82% of the trans-1,4-cyclohexanedicarboxylate moiety.

5. This example illustrates the preparation of the 2-phenylhydroquinone polyester of trans-1,4-cyclohexanedicarboxylic acid by the process of the invention.

A mixture of 20.0 g. (0.10 mole) trans-dimethyl 1,4-cyclohexanedicarboxylate, 29.8 g. (0.10 mole) 2-phenylhydroquinone dipropionate, and titanium tetraisopropoxide (300 ppm Ti, based on the polymer to be made) are placed in a 100 ml .flask equipped as described in Example 1. After being evacuated to 0.5 torr and purged with nitrogen three times, the flask is partially immersed in a metal bath maintained at 280° C. and heated with stirring under a nitrogen atmosphere for 137 minutes. At this time, the distillate weight is 15.4 g. (88% of theory), so vacuum is applied to the flask. During 20 minutes, the pressure is decreased to <0.5 torr where the flask is heated with stirring for an additional 135 minutes. At this time, the reaction mixture is an opaque, light yellow-brown and has a high melt viscosity. The I.V. of the polymer is 0.64, and the trans-1,4-cyclohexanedicarboxylate content is 90%.

6. This example illustrates the preparation (by the process of the invention) of a copolyester of trans-1,4-cyclohexanedicarboxylic acid with two aromatic diol moieties.

A mixture of 20.0 g. (0.10 mole) trans-dimethyl 1,4-cyclohexanedicarboxylate, 11.1 g. (0.05 mole) p-phenylene dipropionate, 15.6 g. (0.05 mole) bisphenol A diacetate, and titanium tetraisopropoxide (150 ppm Ti, based on the polymer being made) are placed in a 100 ml. glass flask equipped as described in Example 1. A prepolymer is prepared by the general procedure of Example 2 and is further polymerized in the solid state by the general procedure of Example 3. The copolyester has an I.V. of 0.63 and contains 86% of the trans-1,4-cyclohexanedicarboxylate moiety.

The invention has been described in detail with particular reference to preferred embodiments thereof, but it will be understood that variations and modifications can be effected within the spirit and scope of the invention.

We claim:
1. Process for preparing poly-1,4-cyclohexanedicarboxylate polyesters having a trans isomer content of at least 80 percent, the process comprising
   a. preparing a reaction mixture of
      1. at least 50 mole percent of an alkyl or aryl diester of trans-1,4-cyclohexanedicarboxylic acid having the general formula

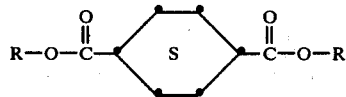

wherein the R's are the same or different and are selected from alkyl groups containing 1 to 4 carbon atoms or phenyl,
      2. up to 50 mole percent of a diester of an aromatic dicarboxylic acid having the general formula

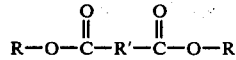

wherein the R's are the same or different and are selected from alkyl groups containing 1 to 4 carbon atoms or phenyl and R' is an aromatic ring structure containing 8 to 20 carbon atoms,
      3. at least one diacyl ester of an aromatic diol having the general formula

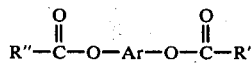

wherein the R'''s may be the same or different and are selected from alkyl groups containing 1 to 4 carbon atoms or phenyl and Ar is the aromatic residue remaining after removal of the hydroxyl groups from an aromatic diol and may be substituted with an alkyl group containing 1 to 4 carbon atoms or phenyl and may contain two or more aromatic diol residues, and
      4. a catalytic amount of a suitable ester exchange and polymerization catalyst
   b. initially heating said reaction mixture sufficient for ester exchange to occur and to eliminate ester condensation byproduct, the byproduct having the following general formula

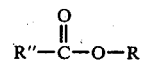

wherein R'' is an alkyl group containing 1 to 4 carbon atoms or phenyl and R is an alkyl group containing 1 to 4 carbon atoms or phenyl, and
   c. reducing pressure to further remove said ester condensation byproduct and to increase the molecular weight of the polyester product.

2. Process of claim 1 wherein said reaction is begun at a temperature of ~260°-280° C. and is increased as the amount of monomeric ester condensation byproduct increases to a maximum of about 320° C.

3. Process of claim 1 wherein the temperature of the reaction does not exceed about 300° C.

4. Process of claim 1 wherein said catalyst is selected from compounds of titanium or tin.

5. Process of claim 4 wherein said catalyst is selected from titanium tetraisopropoxide, titanium tetrabutoxide, acetyltriisopropyltitanate, dibutyl tin dioxide, and dibutyl tin diacetate.

6. Process of claim 4 wherein said catalyst is titanium tetraisopropoxide and is present in the amount of about 100 to 300 parts per million metal based on theoretical polymer yield.

7. Process of claim 1 wherein a prepolymer is prepared, comminuted, crystallized and further polymerized in the solid state at a temperature of at least 10° C. below the melting point of the polymer but not exceeding about 300° C.

8. Product of the process of claim 1.

9. Product of the process of claim 7.

UNITED STATES PATENT AND TRADEMARK OFFICE
CERTIFICATE OF CORRECTION

PATENT NO. : 4,327,206
DATED : April 27, 1982
INVENTOR(S) : Jackson et al

It is certified that error appears in the above—identified patent and that said Letters Patent is hereby corrected as shown below:

Col. 1, line 67 change "8" to ---6---.

Col. 7, line 33 change "8" to ---6---.

Signed and Sealed this

Tenth Day of August 1982

[SEAL]

Attest:

Attesting Officer

GERALD J. MOSSINGHOFF

Commissioner of Patents and Trademarks